United States Patent Office 3,396,428
Patented Aug. 13, 1968

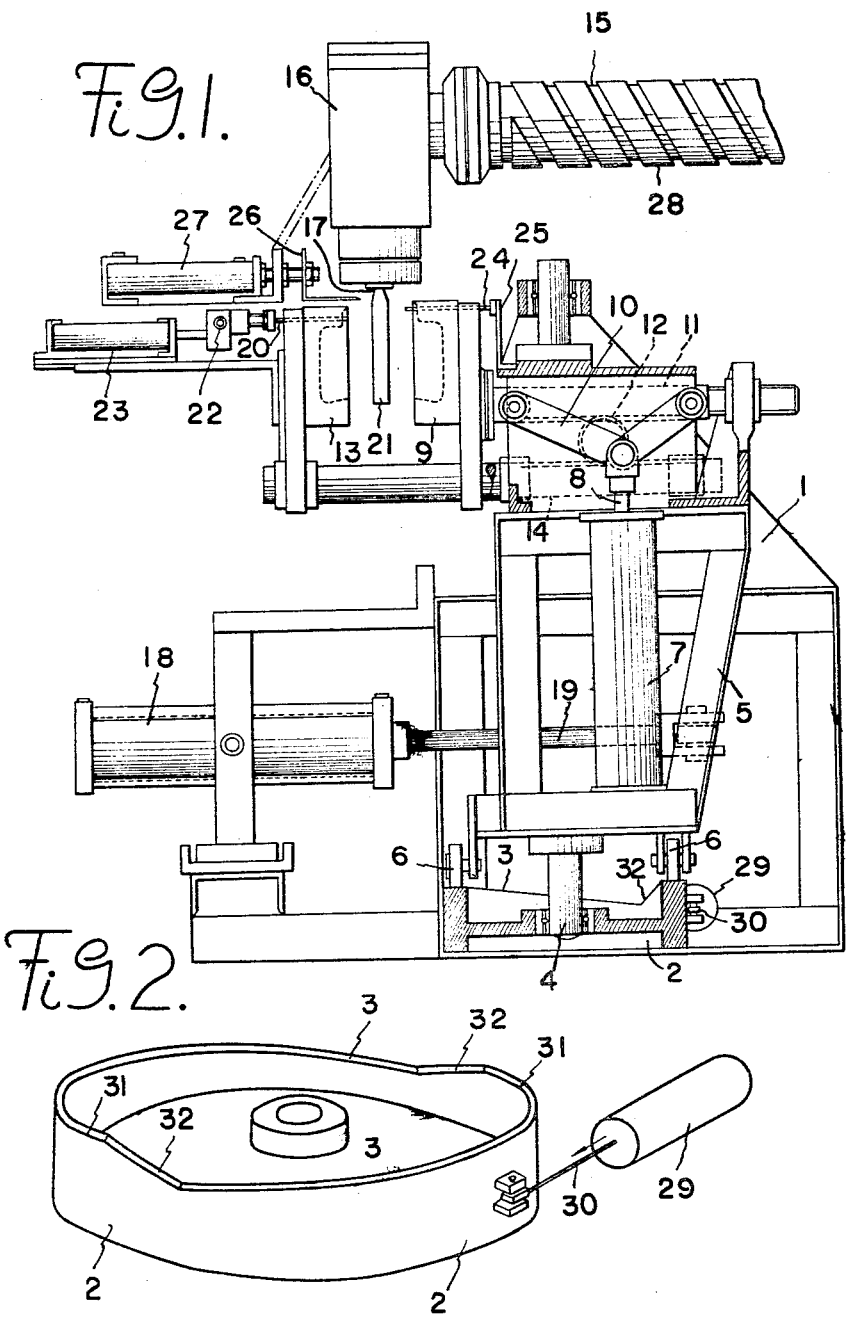

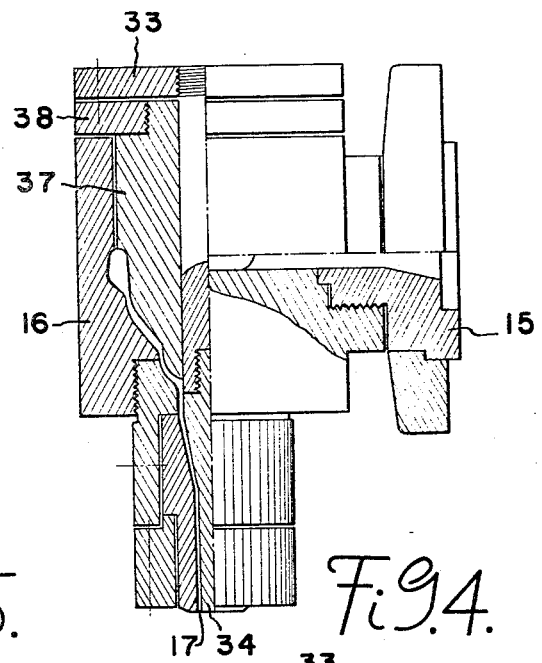
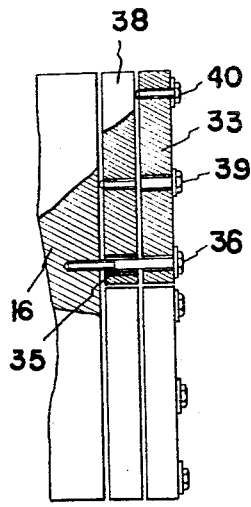
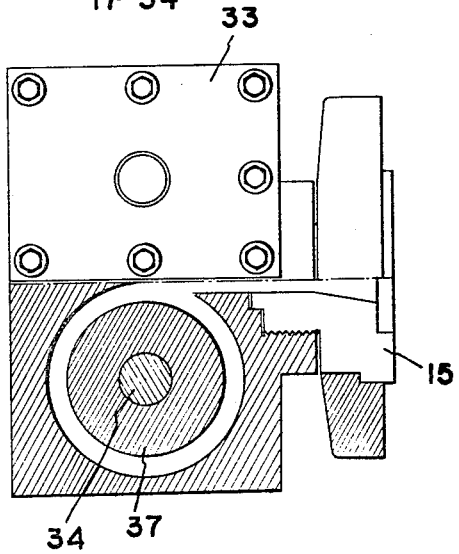

3,396,428
APPARATUS FOR BLOW MOLDING THERMOPLASTIC PLASTICS
Hideo Tahara, 9 Furuishiba 2-chome, Koto-ku, Tokyo, Japan
Filed Mar. 14, 1966, Ser. No. 534,040
5 Claims. (Cl. 18—5)

ABSTRACT OF THE DISCLOSURE

An apparatus for blow molding thermoplastic materials, comprising a rotating frame connected to two split blow mold halves, a pedestal having upper edges which are slanted symmetrically, the rotating frame being disposed on the pedestal freely movable for rotary and vertical movement, and means for moving one of the split mold halves, below the extruder head, and the other of the split mold halves moving so as to closely contact the former mold half, sealing the thermoplastic material extruded from the extruder within the mold cavity.

---

The present invention relates to an apparatus for blow molding thermoplastic materials.

It is one object of the present invention to provide an apparatus for perfectly molding thermoplastic materials extremely efficiently and without danger when removing the molded products.

With this and other objects in view which will become apparent in the following detailed description, the present invention will be clearly understood in connection with the accompanying drawings, in which:

FIGURE 1 is a front elevational view of the thermoplastic molding apparatus of the present invention with parts cut away;

FIG. 2 is a perspective view of the pedestal which rotates the apparatus while raising or lowering the same;

FIG. 3 is a front elevational view of the plastic extrusion controller of the extruding machine head with parts being cut away;

FIG. 4 is a partial plan view of the controller of FIG. 3 with parts being cut away; and FIG. 5 is a side elevational view of FIG. 3 with parts being cut away.

The apparatus of the present invention is characterized in that thermoplastic material extruded from an extruding machine is held between the molds, to be blow molded into articles having desired shapes, and then the mold is lowered while being rotated. The resulting molded articles are removed from the mold at such a position sufficiently spaced apart from the extruder head. On the base of the machine is mounted a pedestal having upper edges which are inclined or slanted symmetrically, and in the center of the pedestal is disposed a center shaft, arranged for free rotary and vertical movement. Around the center shaft are mounted wheels so that the rotating frame is supported by the center shaft and the wheels. The rotating frame is provided with a cylinder with a piston rod coupled to one of the mold parts. The latter is operatively connected to the remaining mold part in such a manner that both mold parts move in opposite directions toward each other, when one of the mold parts is moved inwardly to a position below the extruder head, the other of the molds also moving so as to closely contact the first mold part. The piston rod of a cylinder connected to the base plate is coupled to a suitably selected portion of the rotating frame so that the rotating frame rotates up-and-down due to the reciprocating sliding movement of the piston rod. The rotation of the frame relative the pedestal causes the frame to simultaneously execute an up-and-down movement, carrying the mold therewith, due to the running of the wheels on the inclined edges of the pedestal.

Referring now to the drawings, and more particularly to FIGS. 1 and 2, there is firmly attached to a base plate 1, a disk-like pedestal 2 of which upper edges 3 thereof are formed in a symmetrically slanted configuration. In the center of the pedestal 2 is disposed a center shaft 4 arranged for rotary and free vertical movement. On this center shaft 4 is fixed a rotating frame 5 and wheels 6 are mounted on the rotating frame 5 and rest on the upper peripheral edges 3 of the pedestal 2. The rotating frame 5 is provided with a hydraulic cylinder 7 of which a piston rod 8 is coupled to one mold half 9 through a connecting rod 10. A rack 11 is connected to the mold part 9 and engages a pinion 12 pivotably mounted on the rotating frame 5. The pinion 12 in turn engages a rack 14 connected to the other mold part 13. Consequently, when the mold half 9 is slidably moved inwardly below a plastic extruding port 17 at head 16 of extruding machine 15, by the piston rod 8, the mold half 13 is thereby moved inwardly by the rack 14 so as to interlock engagingly with the mold half 9.

A cylinder 18 is mounted on the base 1 and a piston rod 19 associated therewith is connected to a suitable part of the rotating frame 5 so that the rotating frame 5 is rotated by the slidable reciprocating movement of the piston rod 19 in the cylinder 18. Since the wheels 6 of the rotating frame 5 rest on the slanted edges 3 of the pedestal 2, this rotation of frame 5 causes simultaneously, the wheels 6 which run along the edges 3 to raise and lower the frame 5.

An air injection needle 20 is provided. When the article molded of thermoplastic material is a hollow body, the plastic blank is extruded in a pipe-like form from the head 16 of the extruder 15. When the mold halves 9 and 13 are closed so as to contact each other with the pipe-shaped plastic blank 21 sealed therebetween, the air injection needle 20 pierces through the pipe-shaped plastic blank 21 so that air may then be blown into the plastic blank 21 from blast port 22 to expand the plastic blank 21 and to consequently obtain the desired shaped hollow molded article.

A hydraulic cylinder 23 operates the running operation of the air injection needle 20 and is fitted to the mold half 13. A projecting rod 24 is arranged to facilitate the separation of the mold halves 9 and 13 from their closely contacted state. The rod 24 is fixed to an elastic plate mounted to the rotating frame 5. A cutting blade 26 is provided and actuated by a hydraulic cylinder 27 and is fastened to the extruder head 16 which is independent of the rotating frame 5. A heater 28 heats the extruding machine 15, and a cylinder 29 (FIG. 2) causes the pedestal 2 to rotate by a piston rod 30, extending therefrom, whereas as soon as the die molds 9 and 13 are positioned to hold the plastic material 21 therebetween, the piston rod 30 is moved in the manner shown by the arrow in FIG. 2, thus causing the die molds 9 and 13 together to abruptly fall, due to the lowering of the wheels 6 running along the pedestal edges 3, in the form as they are, together with the rotating frame 5, from the elevated peripheral edges 31 of the pedestal 2 down to a certain portion along the sharply slanted edges 32. In this case, the falling condition is not necessarily such that the wheels 6 fall down along the sharply slanted edges 32 while contacting therewith; it should rather be considered an instantaneous dropping. This movement prevents the continuously extruded plastic blank 21 from contacting the die molds 9 and 13, which are moved away.

A heater 28 heats the extruding machine 15 and a fitting cover 33 (FIG. 3) is provided for fitting the center core 34, and is inserted in the extruding port 17 in the head 16 for extruding the hollow articles by the extruding machine 15. The cover 33 is secured to the head 16 by bolt 36 (FIG. 5) through a collar 35 to form a unitary structure with the head. A center core 37 for adjusting the extruded amount of plastic is provided and formed in a unitary structure with an inner fitting cap 38. It is so arranged that the position of the inner fitting cap 38 is moved up and down by rotation of bolt 39 for adjusting the quantity of extruded plastic material. Further, the cap 38 is pressed by securing a bolt 40, thereby to firmly fix the adjusting center core 37.

In operation, when one mold half movably connected to the rotating frame 5 is operated by the injection of oil or air into the cylinder 7, namely mold half 9, and moved in below the plastic extruding port 17 of the extruder head, the other mold half 13 is also moved by the rack 14 so as to contact and interlock with the mold half 9. The plastic extruded from the extruding machine is at this time sealed within the mold cavity to automatically produce the desired molded plastic articles. After sealing the plastic in the mold, oil or air is injected into the cylinder 18 and the rotating frame 5 is rotated by piston 19 around the center shaft 4. The rotating frame 5 then starts to descend as it rotates as a result of the wheels running along the inclination of the upper peripheral edges 3 of the pedestal 2. The pair of split mold halves 9 and 13 together are likewise rotated, being connected to frame 5, in such manner about the center shaft 4, as well as moving downwardly with the frame 5, being separated, downwardly and swingingly away, from the plastic extruding port 17. As a consequence, the removal of the molded articles may then be effected at a position which is completely spaced from the port 17 and free from thermal effects of the extruding machine. This prevents the possibility of danger to an operator by accidentally touching the hot extruding machine and getting severe burns during the removal of the molded articles.

Further, since the movement of the molds is accompanied not only by rotation but also with descending motion, the plastic materials 21 which are continuously extruded from the extruding machine are not accumulated on the mold parts and therefore remain free of any deformation. As a consequence, this greatly reduces the rate of production of interior articles. Accordingly, the present invention provides a device outstanding in all respects in this type of molding apparatus.

While I have disclosed one embodiment of the present invention it is to be understood that this embodiment is given by example only and not in a limiting sense, the scope of the present invention being determined by the objects and the claims.

I claim:
1. An apparatus for molding thermoplastic materials, comprising
a base plate,
a cylindrical pedestal mounted on said base plate and having a slanted upper peripheral edge,
a center shaft rotatably and vertically freely mounted axially to said cylindrical pedestal and defining an axis of rotation,
a rotating frame mounted to said center shaft,
wheel means movingly disposed on said upper peripheral edge and supporting said rotating frame,
an extruding head means for providing heated thermoplastic material to be molded, and disposed above and axially spaced from said axis of rotation,
split mold dies operatively secured to said rotating frame adjacent said extruding head,
means for opening and closing said split mold dies, and
means connected to said base plate for rotating said rotating frame, causing the latter to undergo simultaneously a vertical movement due to said wheel means moving along said slanted upper peripheral edge, and thereby causing said split mold dies to rotate with said rotating frame toward and away from, and to move vertically toward and away from said extruding head.

2. The apparatus, as set forth in claim 1, wherein said slanted upper peripheral edge is symmetrical.

3. The apparatus, as set forth in claim 1, wherein said means for opening and closing said split mold dies comprises,
a cylinder secured to said rotating frame,
a piston rod movably disposed in said cylinder,
said piston rod operatively coupled to one of said split mold dies for moving the latter under said extruding head, and
means coupling said split mold dies for moving the other of said split mold dies in an opposite direction contactingly against said one of said split mold dies when said piston rod moves the latter under said extruding head.

4. The apparatus, as set forth in claim 1, wherein said means for rotating said rotating frame comprises,
a cylinder secured to said base plate,
a piston rod slidably disposed in said cylinder, and
said piston rod pivotally connected to said rotating frame for causing turning of said rotating frame.

5. The apparatus, as set forth in claim 1, further comprising means for turning said pedestal.

References Cited

UNITED STATES PATENTS

| | | | |
|---|---|---|---|
| 2,349,176 | 5/1944 | Kopitke | 18—5 |
| 2,862,232 | 12/1958 | Rekettye | 18—4 |
| 2,901,769 | 9/1959 | Sherman et al. | 18—5 |
| 2,975,473 | 3/1961 | Hagen et al. | 18—5 X |
| 3,235,907 | 2/1966 | Harwood et al. | 18—5 |

FOREIGN PATENTS

| | | |
|---|---|---|
| 1,314,044 | 11/1962 | France. |

WILBUR L. McBAY, *Primary Examiner.*